Nov. 27, 1945.   N. W. DALTON   2,389,767
STRUCTURAL FRAME
Filed Sept. 1, 1943

INVENTOR
Nelson W. Dalton.
BY John P. Tarbox
ATTORNEY

Patented Nov. 27, 1945

2,389,767

UNITED STATES PATENT OFFICE 2,389,767

STRUCTURAL FRAME

Nelson W. Dalton, Moorestown, N. J., assignor to Edward G. Budd Manufacturing Co., Philadelphia, Pa., a corporation of Pennsylvania Application September 1, 1943, Serial No. 500,786

6 Claims. (Cl. 189—34)

This invention relates to structural frames and frame elements, particularly such frames and elements as are especially suited for stiffening and strengthening skin sheets for semi-monocoque aircraft construction, and has for an object the provision of improvements in this art.

One of the particular objects of the invention is the provision of a structure which is extremely strong for its weight and in which all portions of the structural elements which do not provide the maximum strength for weight are eliminated.

Another object is to provide structural elements which can be easily and quickly conformed to various desired contours but which when secured to the contoured skin sheets will provide a very rigid structure which permanently retains its shape.

Another object is to provide structural elements which are very simple and easy to form; which may with equal facility be formed into small or large sizes; and which are easy to assemble in various sizes.

The above and other objects of the invention will be apparent from the following description and accompanying drawing, wherein.

Figure 1:
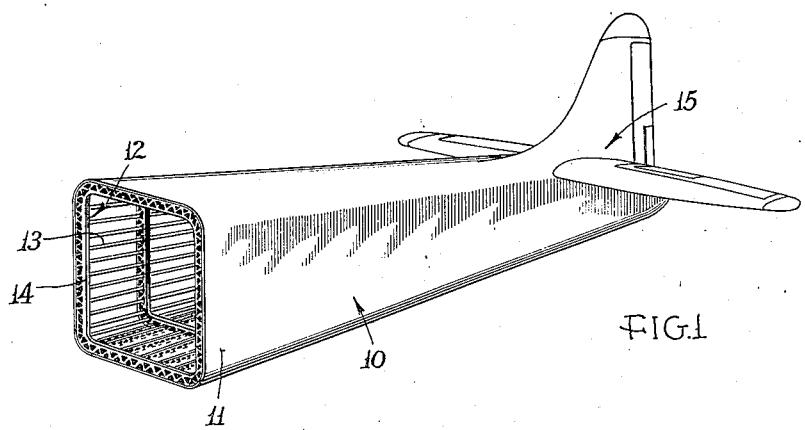
Fig. 1 is a section and perspective view of the rear fuselage and tail portions of an airplane embodying the present invention.

The airplane fuselage 10 shown in Fig. 1 includes a skin sheet 11 and an interior frame 12 constructed according to the present invention. The frame includes skin stiffeners or stringers 13 and bulkheads or girdles 14. The vertical and horizontal stabilizers of the empennage or tail 15 may be of similar construction, as may also the wings and other airfoils of the aircraft. The construction is also particularly adapted for dirigibles and other rigid or semi-rigid gas-buoyed aircraft; and of course is adapted for land and water craft and even buildings and other fixed structures since it provides a great saving in structural materials as well as the light weight which is so particularly desirable for aircraft.

Both the stringers 13 and the rib-like elements or bulkheads 14 are formed of the same type of members. These members comprise outer flanges or plates 17 and inner flanges or plates 18, the outer and inner flanges or plates being connected by side walls or webs 19.

The outer plate is preferably wide and uncut to provide a continuous sheet of material at the maximum distance from the neutral axis of the member, considered as a beam. This provides the maximum moment of inertia and strength. The inner plate is discontinuous, both longitudinally and transversely to form spaced feet or pads. And the side walls are formed with lightening openings of large size so as to eliminate as much material as possible adjacent the neutral axis leaving only sufficient material to carry the shear, tension and compression loads between plates. The beam is U-shaped, either of common form with a broad back and parallel arms or with spread arms like a truncated V. The edges of the lightening openings, except near the outer plate, are provided with flanges 20 to furnish greater rigidity to the strips or struts 21 between the openings.

In the form illustrated the two side walls or webs 19 are parallel and the interior space of the beam cross section is rectangular, but they may be divergent to form a beam section of truncated triangular shape.

Figure 3:
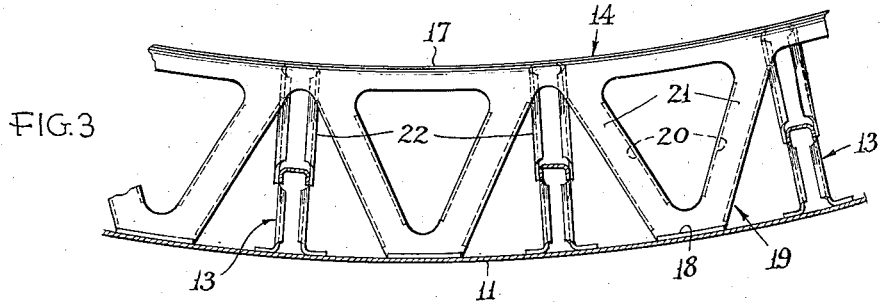
Fig. 3 is a section and side elevation of a portion of a frame and skin sheet of curved contour, similar to a corner of the cross section shown in Fig. 1 but of greater radius of curvature.
Figure 2:
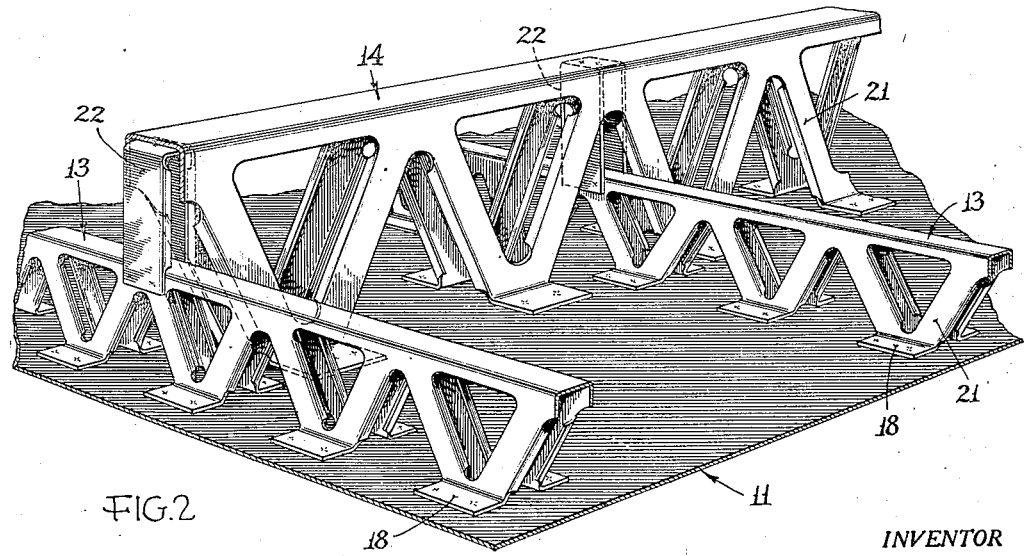
Fig. 2 is an enlarged section and perspective through a portion of the frame and skin sheet on one side.

The corners of the triangular shaped lightening openings are curved or arcuate to avoid sharp corners of incipient breakage. Before attachment to the sheet the beam may be readily bent, since the inner plate is discontinuous between the feet, to fit various contours of skin sheet. When attached through the feet to the skin sheet the latter becomes a part of the beam and the composite structure is very rigid since the skin sheet also connects adjacent webs of a beam. The skin sheet, in effect, forms a part of the inner plate of the beam after attachment.

Where beams of different sizes cross, as shown in Figs. 2 and 3, the smaller beam may be passed through an aperture of the larger without interruption to either and if desired the two beams may be secured together, as by a U-shaped clip 22. The clip is attached through its back to the inside of the outer plate of the larger beam and through its side arms to the sides or webs of the smaller beam. The open construction of the beams provides good access for attaching tools and is particularly useful for welding. The back of the clip may be attached with the arms spread apart and then the arms may be closed upon the sides of the smaller beam and welded thereto.

Besides being easy to conform and apply, the beams are very easy to manufacture. They may be die-punched and shaped from flat stock, then flanged on the edges to form the feet, and finally bent into U or V shape, whichever is desired.

The clips likewise are easy to form by a similar method.

The beams are very easy to attach to the skin sheet, the outturned feet being completely accessible for welding, riveting, or bolting.

With spaced feet it is not necessary to have continuous weld lines, as with running base flanges, and the tendency of the skin sheet to buckle or break at the weld line is largely avoided. Moreover locked-up stresses which are characteristic of weld lines are largely avoided.

While one embodiment of the invention has been specifically described it is to be understood that there may be various modifications within the limits of the prior art and the scope of the subjoined claims.

What is claimed is:

1. A strong, light, and rigid skin sheet and frame construction adapted for aircraft and the like comprising a generally U-shaped beam having a continuous plate as the back of the U, side webs integral with the back plate and having inclined struts and lightening openings therebetween, the struts on each side being joined in pairs at apices opposite said back plate, the struts on the two sides being coaxially arranged in pairs and the alternate openings of each side web extending through the side of the beam opposite the back plate, and outturned feet on the strut apices which are spaced apart longitudinally and transversely, the spaced feet being secured to a skin sheet.

2. A strong, light, and rigid skin sheet and frame construction adapted for aircraft and the like, comprising a generally U-shaped beam having a continuous plate as the back of the U, side webs integral with the back plate and having inclined struts and lightening openings therebetween, the struts on each side being joined in pairs at apices opposite said back plate, the struts on the two sides being coaxially arranged in pairs and the alternate openings of each side web extending through the side of the beam opposite the back plate, and outturned feet on the strut apices which are spaced apart longitudinally and transversely, the spaced feet being secured to a skin sheet, said lightening openings being triangular with curved corners and with flanges on the two strut sides of each opening.

3. A strong, light, and rigid frame and skin construction adapted for aircraft and the like, comprising a large beam having a back plate and a side web, the side web having triangular apertures arranged in regular series with their apices disposed in alternation in opposite directions, alternate ones of which apertures are open at the base of the triangle opposite the back plate, a small beam of the same shape passing through an open-sided aperture of the large beam, both beams being connected to a skin sheet on the side opposite the back plate, and a clip connecting the back plate of the large beam to the side web of the small beam adajacent the back plate at the crossing, said clip being U-shaped and connected through its back to the inside of the back plate of the large beam and connected through an arm to the side of the web of the small beam.

4. A strong, light, and rigid frame and skin construction adapted for aircraft and the like, comprising a large beam having a back plate and webs on each side thereof, the side webs each having triangular apertures arranged in regular series with their apices disposed in alternation in opposite directions, alternate ones of which apertures are open at the base of the triangle opposite the back plate, and a small beam of the same shape passing through two transversely aligned open-sided apertures in the large beam, both of said beams having spaced feet on the side webs opposite the back plate attached to a skin sheet.

5. A strong, light, and rigid frame and skin construction adapted for aircraft and the like, comprising a large beam having a back plate and webs on each side thereof, the side webs each having triangular apertures arranged in regular series with their apices disposed in alternation in opposite directions, alternate ones of which apertures are open at the base of the triangle opposite the back plate, a small beam of the same shape passing through two transversely aligned open-sided apertures in the large beam, both beams being connected to a skin sheet on the side opposite the back plate, and a clip connecting the back plate of the large beam to the side webs of the small beam at the crossing.

6. A strong, light, and rigid frame and skin construction adapted for aircraft and the like, comprising a large beam having a back plate and webs on each side thereof, the side webs each having triangular apertures arranged in regular series with their apices disposed in alternation in opposite directions, alternate ones of which apertures are open at the base of the triangle opposite the back plate, a small beam of the same shape passing through two transversely aligned open-sided apertures in the large beam, both beams being connected to a skin sheet on the side opposite the back plate, and a clip connecting the back plate of the large beam to the side webs of the small beam at the crossing, said clip being U-shaped and connected through its back to the inside of the back plate of the large beam and connected through its arms to the sides of the side webs of the small beam.

NELSON W. DALTON.